(12) United States Patent
Murakami

(10) Patent No.: US 9,898,434 B2
(45) Date of Patent: Feb. 20, 2018

(54) SYSTEM, PROCESS CONTROL METHOD AND MEDIUM

(71) Applicant: FUJITSU LIMITED, Kawasaki-shi, Kanagawa (JP)

(72) Inventor: Takeo Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 15/002,626

(22) Filed: Jan. 21, 2016

(65) Prior Publication Data

US 2016/0217091 A1 Jul. 28, 2016

(30) Foreign Application Priority Data

Jan. 27, 2015 (JP) .................................. 2015-013671

(51) Int. Cl.
*G06F 15/16* (2006.01)
*G06F 13/372* (2006.01)
*G06F 13/40* (2006.01)

(52) U.S. Cl.
CPC ........ *G06F 13/372* (2013.01); *G06F 13/4068* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 7,493,427 B2 * | 2/2009 | Freimuth ............ G06F 12/0862 709/213 |
| 7,533,176 B2 * | 5/2009 | Freimuth ................ H04L 49/90 370/235 |
| 7,822,945 B2 * | 10/2010 | Hayashi ................ G06F 9/5044 712/34 |
| 8,812,898 B1 * | 8/2014 | Lahon ..................... G06F 11/10 714/4.2 |
| 9,652,247 B2 * | 5/2017 | Li ......................... G06F 9/3863 |

FOREIGN PATENT DOCUMENTS

| JP | 2007-514214 | 5/2007 |
| JP | 2010-257056 | 11/2010 |
| WO | WO 2005/041056 | 5/2005 |

* cited by examiner

*Primary Examiner* — Cheng-Yuan Tseng
(74) *Attorney, Agent, or Firm* — Staas & Halsey LLP

(57) ABSTRACT

A system includes: a first processor; a second processor; and a communication bus configured to couple the first processor and the second processor; wherein the first processor is configured to obtain a bus usage rate by monitoring a delay time period of data transfer in the communication bus, determine whether to offload a processing on received data based on the monitored bus usage rate, and offload the processing to the second processor when the processing is determined to be offloaded.

17 Claims, 23 Drawing Sheets

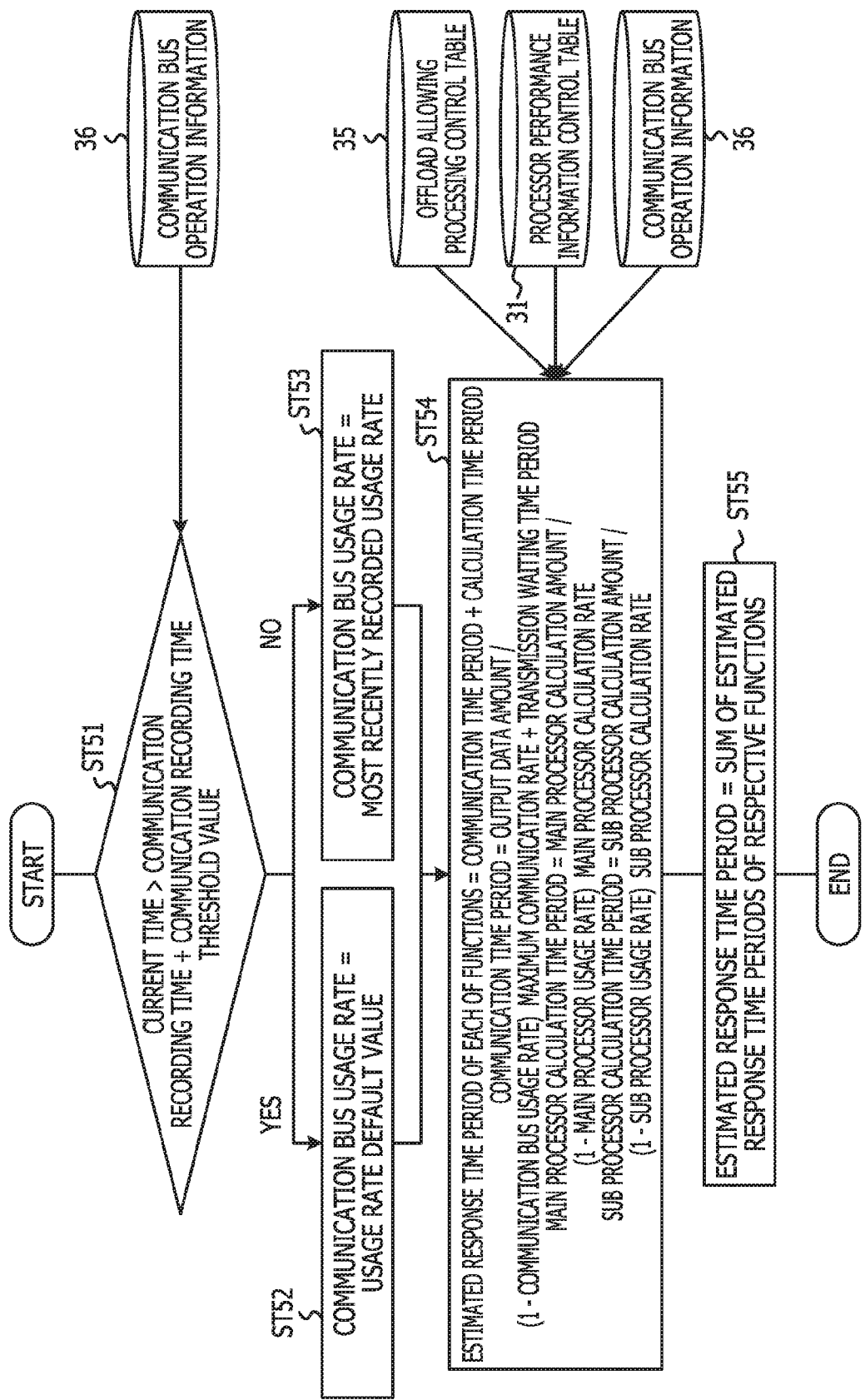

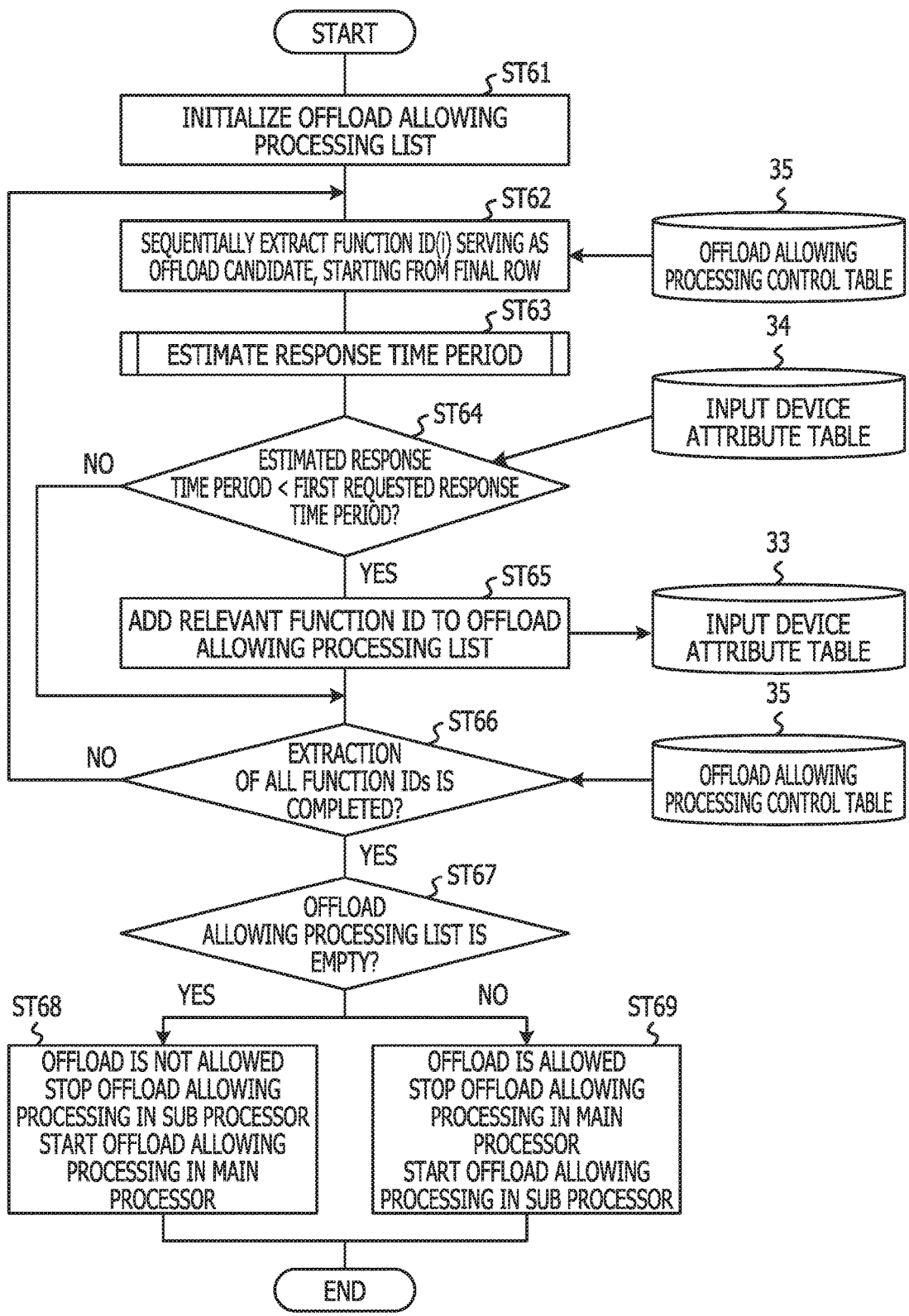

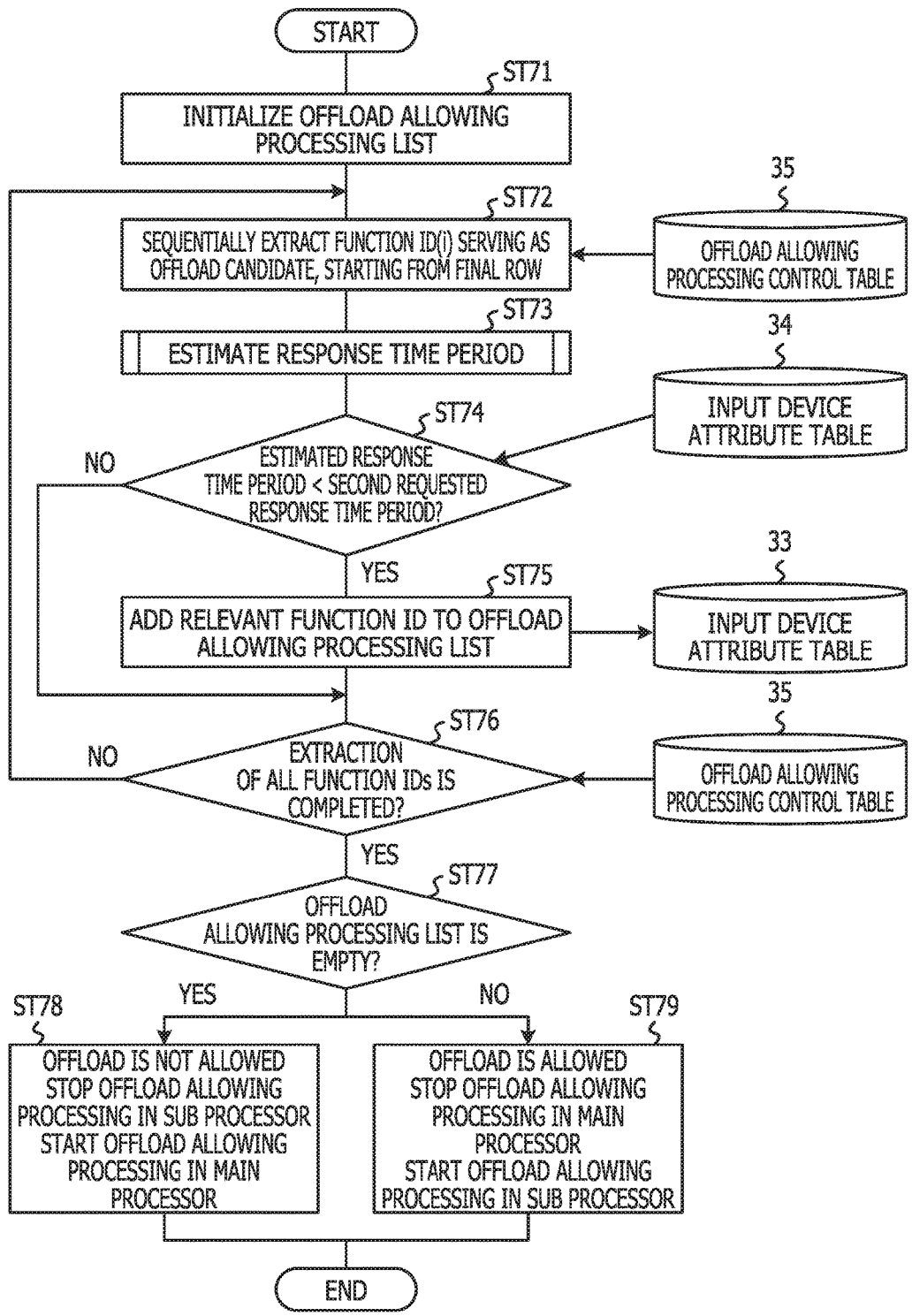

FIG. 14A

SET AT TIME OF START-UP  36

| | |
|---|---|
| MAXIMUM COMMUNICATION RATE (byte/ms) | 200 |
| USAGE RATE DEFAULT VALUE (%) | 99 |
| COMMUNICATION RECORDING TIME THRESHOLD VALUE (ms) | 10000 |

FIG. 14B

MEASURED AND UPDATED DURING EXECUTION  36

| | |
|---|---|
| COMMUNICATION BUS USAGE RATE (%) | 50 |
| COMMUNICATION RECORDING TIME (ms) | 20000 |
| TRANSMISSION WAITING TIME PERIOD (ms) | 0.1 |

FIG. 15

| FUNCTION ID | MAIN PROCESSOR CALCULATION AMOUNT (NUMBER OF INSTRUCTIONS) | SUB PROCESSOR CALCULATION AMOUNT (NUMBER OF INSTRUCTIONS) | INPUT DATA AMOUNT (byte) | OUTPUT DATA AMOUNT (byte) |
|---|---|---|---|---|
| A | 0.3K | 0.2K | 200 | 200 |
| B | 0.4K | 0.3K | 100 | 200 |
| C | 0.3K | 0.2K | 100 | 100 |
| D | 0.5K | 0.4K | 100 | 100 |
| E | 0.4K | 0.4K | 150 | 100 |

35

← OFFLOAD ALLOWING PROCESSING CANDIDATES ARE SEQUENTIALLY DEFINED STARTING FROM FINAL ROW

FIG. 16

| INPUT DEVICE ID | X |
|---|---|
| FIRST REQUESTED RESPONSE TIME PERIOD (ms) | 4.0 |
| SECOND REQUESTED RESPONSE TIME PERIOD (ms) | 4.5 |

| FUNCTION ID | EXECUTION PROCESSOR |
|---|---|
| A | Main |
| B | Sub |
| C | Sub |
| D | Sub |
| E | Sub |

| TYPE OF CPU | CALCULATION RATE (NUMBER OF INSTRUCTIONS / ms) |
|---|---|
| MAIN PROCESSOR | 3K |
| SUB PROCESSOR | 1K |

FIG. 19

| TYPE OF CPU | Busy TIME PERIOD (ms) | Idle TIME PERIOD (ms) | PROCESSOR USAGE RATE (%) |
|---|---|---|---|
| MAIN PROCESSOR | 300 | 700 | 30 |
| SUB PROCESSOR | 100 | 900 | 10 |

FIG. 22

| FUNCTION ID | MAIN PROCESSOR CALCULATION AMOUNT (NUMBER OF INSTRUCTIONS) | SUB PROCESSOR CALCULATION AMOUNT (NUMBER OF INSTRUCTIONS) | INPUT DATA AMOUNT (byte) | OUTPUT DATA AMOUNT (byte) |
|---|---|---|---|---|
| A (POSITION PREDICTION PROCESSING OPERATION) | 0.3K | 0.2K | 200 | 200 |
| B (DATA INTERPRETATION PROCESSING OPERATION) | 0.4K | 0.3K | 100 | 200 |
| C (POSITION CORRECTION PROCESSING OPERATION) | 0.3K | 0.2K | 100 | 100 |
| D (INPUT ERROR DETECTION PROCESSING OPERATION) | 0.5K | 0.4K | 100 | 100 |
| E (TOUCH IC DATA READ PROCESSING OPERATION) | 0.4K | 0.4K | 150 | 100 |

FIG. 23

| INPUT DEVICE ID | TOUCH |
|---|---|
| FIRST REQUESTED RESPONSE TIME PERIOD (ms) | 4.0 |
| SECOND REQUESTED RESPONSE TIME PERIOD (ms) | 4.5 |

34

SYSTEM, PROCESS CONTROL METHOD AND MEDIUM

CROSS-REFERENCE TO RELATED APPLICATION

This application is based upon and claims the benefit of priority of the prior Japanese Patent Application No. 2015-013671, filed on Jan. 27, 2015, the entire contents of which are incorporated herein by reference.

FIELD

The embodiments discussed herein are related to a system, a process control method and a medium.

BACKGROUND

In recent years, functions and performance requested for, for example, mobile phones have become more highly advanced year by year, and smartphones and tablet terminals each equipped with various devices such as a large-sized liquid crystal screen, a touch panel, a camera, and a GPS have prevailed.

While, in each of such highly-functional mobile phones, power consumption tends to increase, there is a limit to electric power able to be supplied from an installed battery. Therefore, in order to further lengthen a time period of being able to be battery-powered, it is desirable to reduce power consumption.

In addition to the smartphones and the tablet terminals, this applies to portable game devices and various portable terminals, each of which is equipped with various functions. In such battery-powered mobile terminals, for example, a processor, a communication circuit, a display, and so forth may be cited as modules whose power consumptions are high.

In addition, in association with high functionality and improvement of performance of mobile terminals, some mobile terminals equipped with multi-core processors have prevailed. Furthermore, some mobile terminals, which are each equipped with various types of processor having different processing capacities and different power consumptions, have been provided.

In, for example, a mobile terminal equipped with various types of processor, a main processor whose processing capacity is high and a sub processor whose power consumption is low are used properly so that a main program is executed in the main processor and some processing operations in programs, such as calculation processing and sound decoding processing, are executed in the sub processor.

Furthermore, in a mobile terminal equipped with various types of processor, a mechanism, in which sensing processing for, for example, a touch panel, various kinds of sensors, or an input apparatus is frequently performed by a sub processor and power consumption is suppressed while maintaining the degree of accuracy of sensing, is installed.

Note that the main processor is, for example, a general-purpose processor whose processing capacity is high and whose power consumption is high and the sub processor is, for example, a processor such as a digital signal processor (DSP), whose processing capacity is limited and whose power consumption is low.

By the way, in the past, various proposals have been made as a control technology for an arithmetic processing system including various types of processor.

As technical literatures of the related art, there are Japanese Laid-open Patent Publication No. 2010-257056 and Japanese National Publication of International Patent Application No. 2007-514214.

As described above, in arithmetic processing systems each including a main processor and a sub processor, whose power consumptions are different, an arithmetic processing system that causes, for example, a sub processor to frequently perform sensing processing for a touch panel, thereby achieving reduction of power consumption, has been provided.

However, if processing operations based on the sub processor overlap with each other, thereby increasing a load, it becomes difficult to satisfy a response time period allowable for, for example, sensing processing for a touch panel (an input operation of a user), thereby causing deterioration of responsiveness. In other words, it becomes difficult to reduce power consumption by reducing the processing amount of the main processor while satisfying a restriction of a response time period of processing based on the sub processor.

SUMMARY

According to an aspect of the invention, a system includes: a first processor; a second processor; and a communication bus configured to couple the first processor and the second processor; wherein the first processor is configured to obtain a bus usage rate by monitoring a delay time period of data transfer in the communication bus, determine whether to offload a processing on received data based on the monitored bus usage rate, and offload the processing to the second processor when the processing is determined to be offloaded.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a flowchart for explaining an example of processing in a response time period estimation unit in the main processor in the arithmetic processing system illustrated in FIG. 6;

FIG. 12 is a flowchart for explaining an example of processing in an offload determination and instruction unit in the main processor in the arithmetic processing system illustrated in FIG. 6;

FIG. 13 is a flowchart for explaining an example of processing in an offload determination and instruction unit in the sub processor in the arithmetic processing system illustrated in FIG. 6;

FIGS. 14A and 14B are diagrams for explaining examples of communication bus operation information in a main memory in the arithmetic processing system illustrated in FIG. 6;

FIG. 15 is a diagram for explaining an example of an offload allowing processing control table in the main memory in the arithmetic processing system illustrated in FIG. 6;

FIG. 16 is a diagram for explaining an example of an input device attribute table in the main memory in the arithmetic processing system illustrated in FIG. 6;

FIG. 17 is a diagram for explaining an example of an offload execution processor control table in the main memory in the arithmetic processing system illustrated in FIG. 6;

FIG. 18 is a diagram for explaining an example of a processor performance information control table in the main memory in the arithmetic processing system illustrated in FIG. 6;

FIG. 19 is a diagram for explaining an example of a processor operation information control table in the main memory in the arithmetic processing system illustrated in FIG. 6;

FIG. 22 is a diagram for explaining an example of the offload allowing processing control table in the main memory in a case of performing the touch input processing illustrated in each of FIG. 20 and FIG. 21; and FIG. 23 is a diagram for explaining an example of the input device attribute table in the main memory in a case of performing the touch input processing illustrated in each of FIG. 20 and FIG. 21.

DESCRIPTION OF EMBODIMENTS

According to one aspect of a disclosed example, an arithmetic processing system capable of reducing power consumption by reducing the processing amount of a main processor while satisfying a restriction of a response time period for processing based on a sub processor and a control method for the arithmetic processing system are provided. Before describing in detail the arithmetic processing system and the control method for the arithmetic processing system of the present example, examples of an arithmetic processing system and a control method for the arithmetic processing system and problems thereof will be described with reference to FIG. 1 to FIG. 5.

Figure 1:
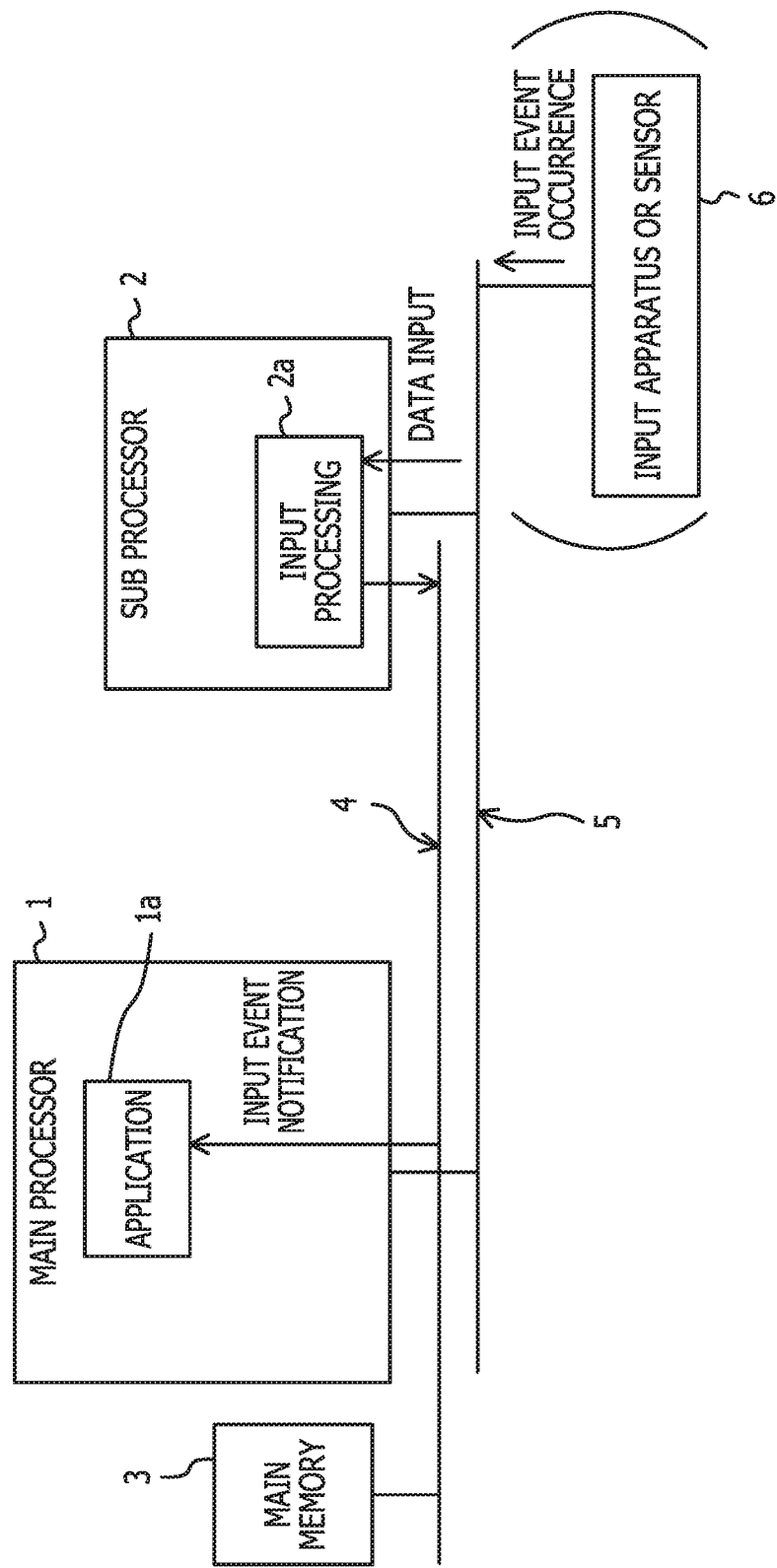
FIG. 1 is a block diagram illustrating an example of an arithmetic processing system.

FIG. 1 is a block diagram illustrating an example of an arithmetic processing system. As illustrated in FIG. 1, the arithmetic processing system includes, for example, a main processor (main CPU) 1, a sub processor (sub CPU) 2, a main memory 3, a communication bus 4, and an input-output (I-O) bus 5.

The main processor 1, the sub processor 2, and the main memory 3 are connected to one another via the communication bus 4, and, for example, an input apparatus or a sensor 6, installed outside, is bus-connected to the main processor 1 and the sub processor 2 via the I-O bus 5.

The main processor (a first processor) 1 is, for example, a general-purpose processor whose processing capacity is high and whose power consumption is high, and the main processor (the first processor) 1 executes an application (main program) 1a and uses the sub processor 2 in an auxiliary role.

In addition, the sub processor (a second processor) 2 is, for example, a processor such as a DSP, whose processing capacity is limited and whose power consumption is low, and by entrusting as much processing (input processing 2a) as possible to the sub processor 2, it becomes possible to reduce power consumption.

The input processing 2a is processing (for example, sensing processing for a touch panel) based on a data input inputted by, for example, the input apparatus or the sensor 6 via the I-O bus 5. In addition, an input result obtained by processing in the sub processor 2 is given, as an input event notification, to the application 1a on the main processor 1 via the communication bus 4.

Here, the number of each of the main processors 1 and the sub processors 2 is not limited to one, and furthermore, the main processor 1 may include processor cores. Note that differences in magnitudes (levels) of the processing capacity and the power consumption between the main processor 1 and the sub processor 2 are relative differences, and it goes without saying that the sub processor 2 is not limited to the DSP.

Figure 2:
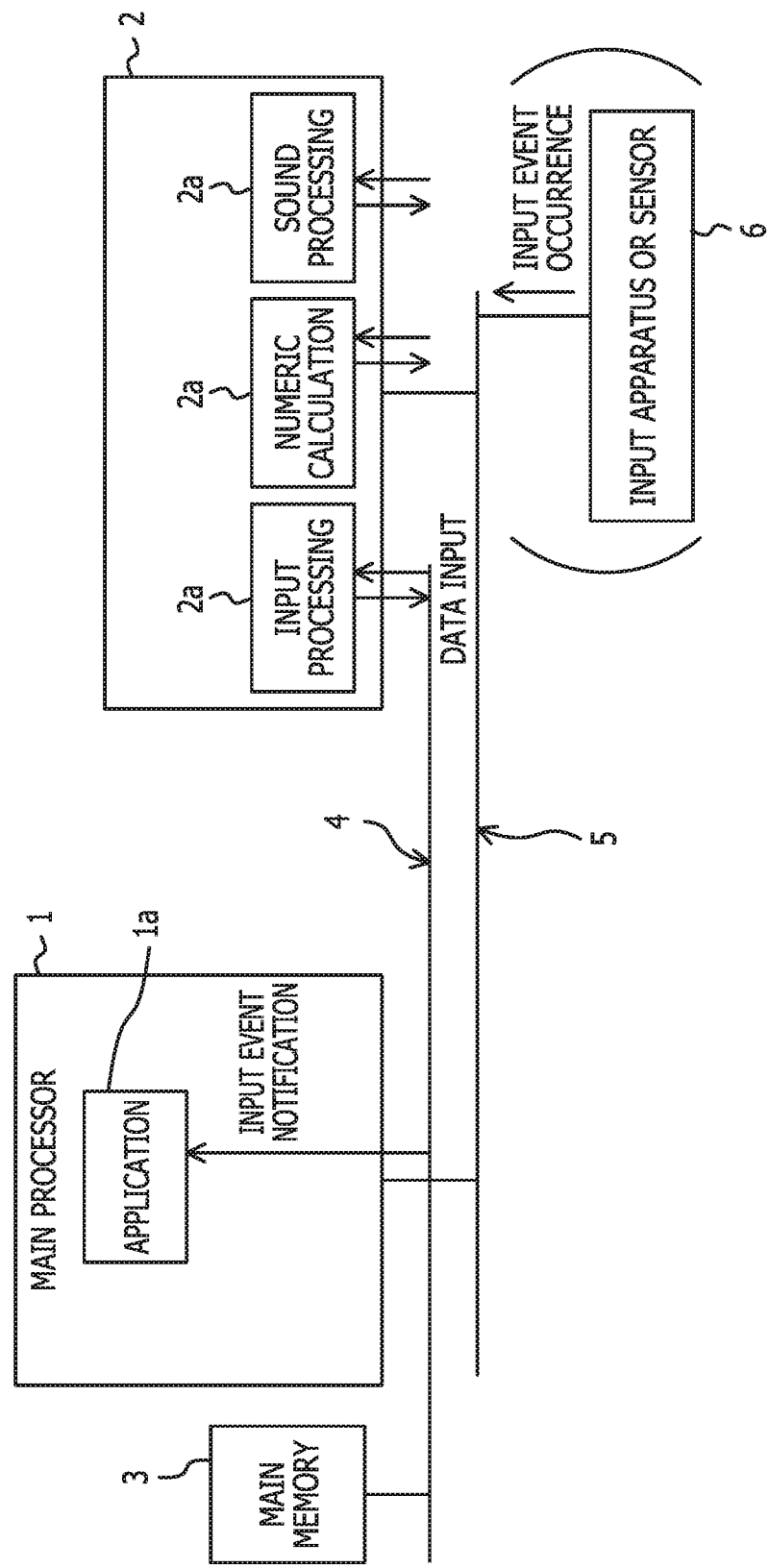
FIG. 2 is a diagram for explaining a problem in the arithmetic processing system illustrated in FIG. 1.

FIG. 2 is a diagram for explaining a problem in the arithmetic processing system illustrated in FIG. 1, and FIG. 2 illustrates a state in which the sub processor 2 performs processing operations such as numeric calculation 2b and sound processing 2c in addition to the input processing 2a, thereby increasing a load.

If, as illustrated in FIG. 2, the load of the sub processor 2 increases, a processing time period taken for, for example, the input processing 2a from the input apparatus and the sensor 6 increases, and the input event notification for the application 1a on the main processor 1 is delayed. As a result, deterioration of responsiveness for, for example, an input operation of the user (for example, sensing processing for the touch panel) is likely to be caused.

Figure 3:
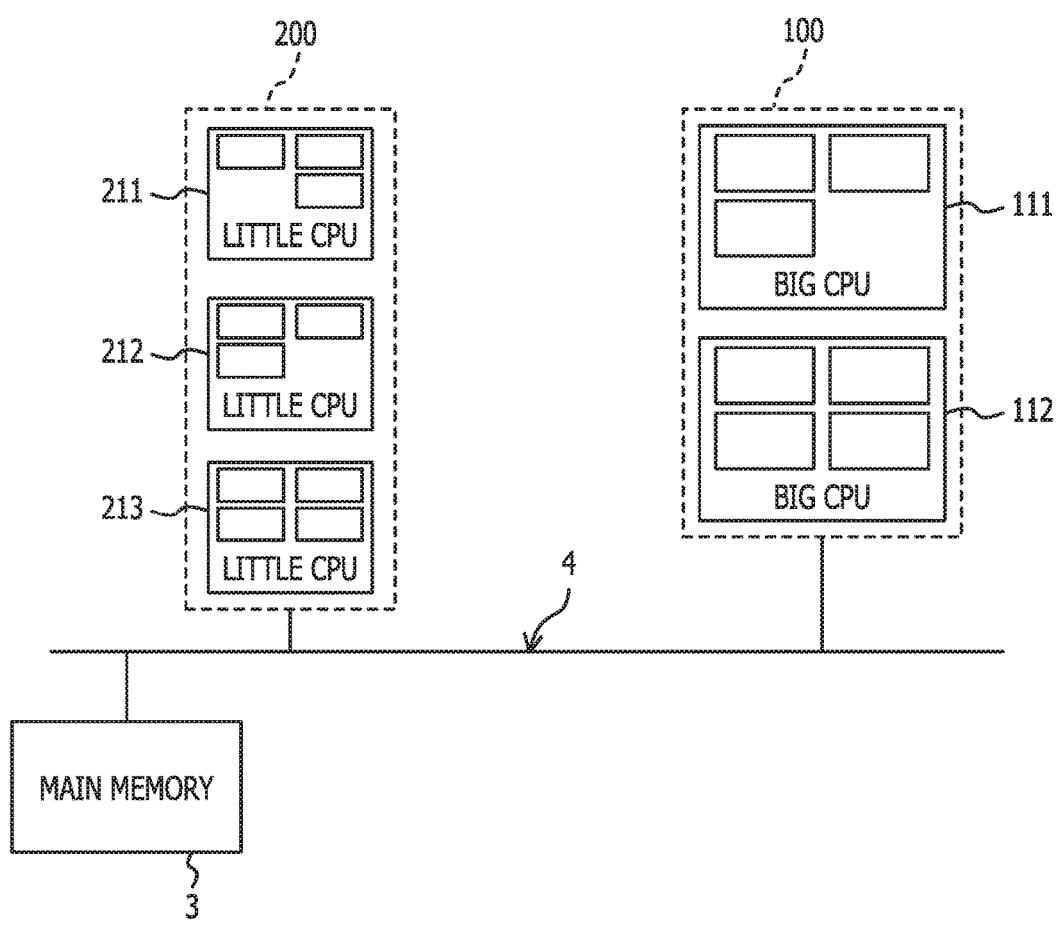
FIG. 3 is a diagram for explaining a control method in another example of the arithmetic processing system.

FIG. 3 is a diagram for explaining a control method in another example of the arithmetic processing system. As illustrated in FIG. 3, the main memory 3, a first cluster 100 including two main processors (Big CPUs) 111 and 112, and a second cluster 200 including three sub processors (LITTLE CPUs) 211 to 213 are bus-connected to one another via the communication bus 4.

Here, each of the main processors 111 and 112 has high power consumption while having high processing capacity, and each of the sub processors 211 to 213 has low power consumption while having low processing capacity. In addition, these processors 111, 112, and 211 to 213 simultaneously operate.

In addition, if the load of, for example, the sub processor 211 increases and an execution waiting time period (a staying time period on a run queue) increases and exceeds a threshold value, the processing of the sub processor 211 is moved to the main processor 111 and is processed by the main processor 111.

However, in the example of FIG. 3, even in a case where the usage rate of, for example, the communication bus 4 increases and a communication time period increases, if the load of the sub processor 211 does not exceed the threshold value, a task continues a state of being assigned to the sub processor 211.

Figure 4:
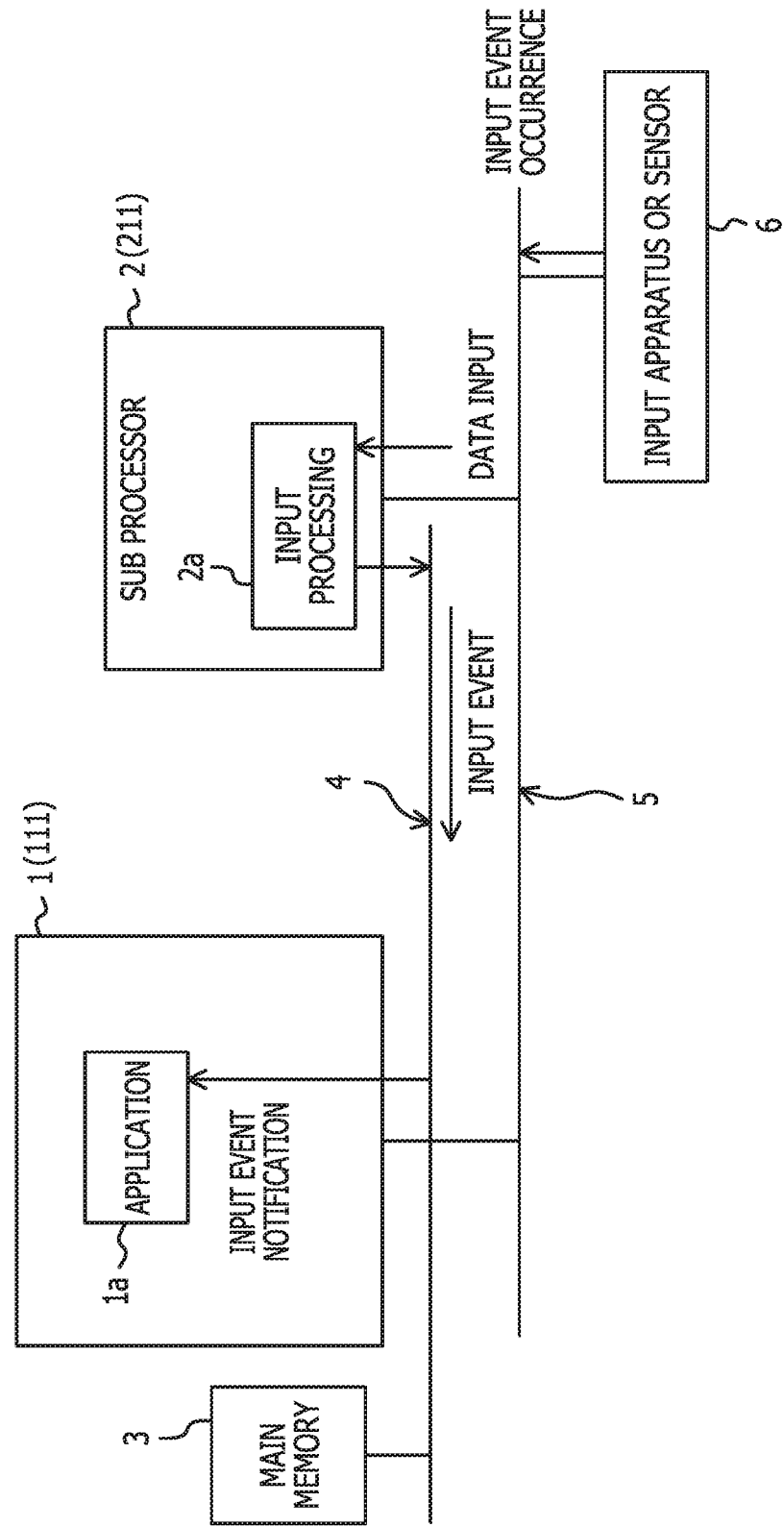
FIG. 4 is a diagram for explaining a problem in the arithmetic processing system illustrated in FIG. 3.

FIG. 4 is a diagram for explaining a problem in the arithmetic processing system illustrated in FIG. 3 and only illustrates the main processor 111 (1) and the sub processor 211 (2). As described above, in a case where a communication time period from the sub processor 2 to the main processor 1 increases in a state in which the load of, for example, the sub processor 2 does not exceed the threshold value, the input event notification to the application 1a on the main processor 1 is delayed.

In other words, usually, in addition to the main processor 1 and the sub processor 2, other various sub components including the main memory 3 are connected to the communication bus 4.

Therefore, if components other than the main processor 1 and the sub processor 2 perform communication by using the communication bus 4, the load of the communication bus 4 increases, and in such a case, a communication time period between the main processor 1 and the sub processor 2 increases.

Figure 5:
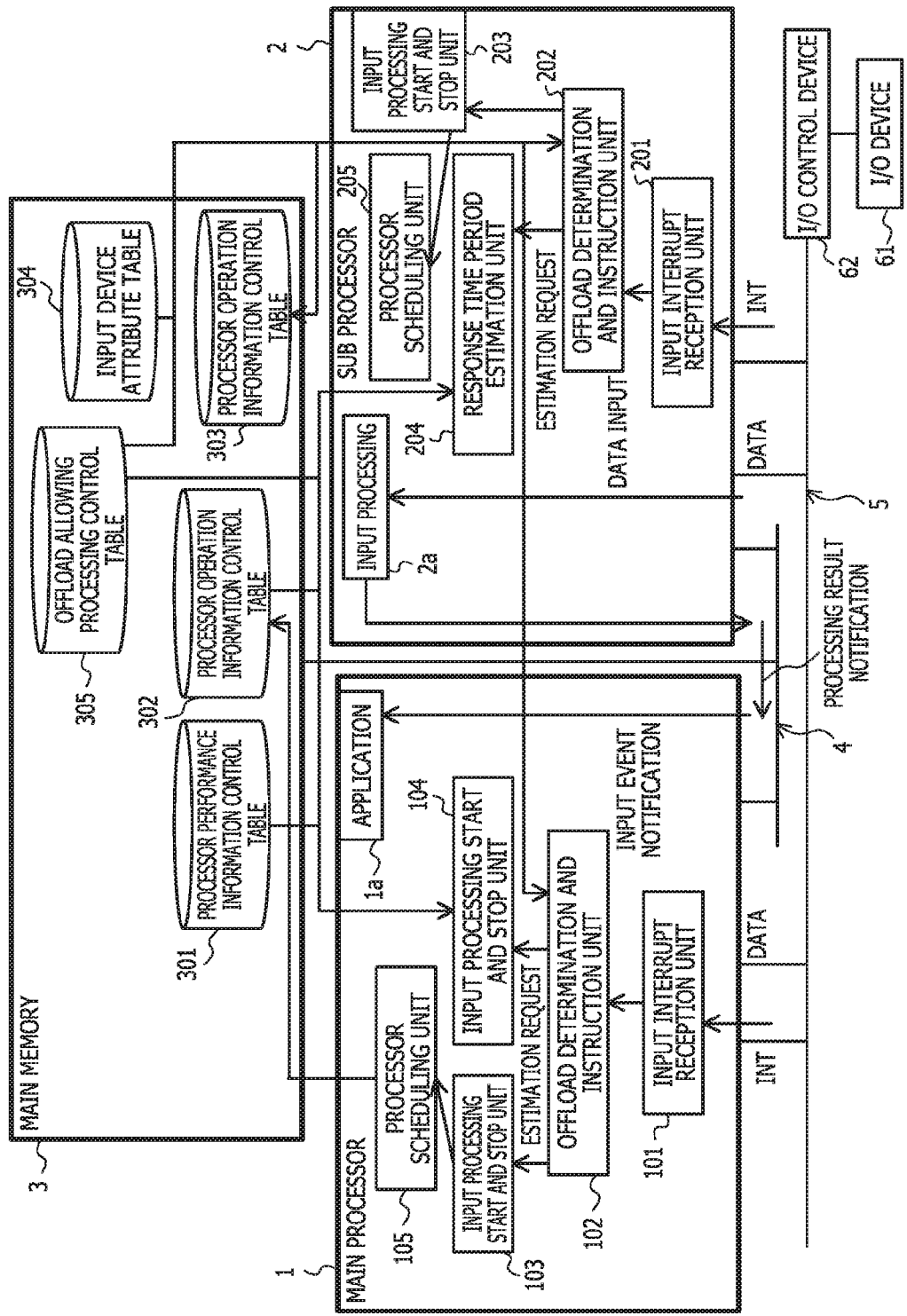
FIG. 5 is a block diagram illustrating in more detail an example of the arithmetic processing system.

FIG. 5 is a block diagram illustrating in more detail an example of the arithmetic processing system and corresponds to an arithmetic processing system of the related art, illustrated while being caused to correspond to the arithmetic processing system of the present embodiment, described later. As illustrated in FIG. 5, the main processor 1 includes an input interrupt reception unit 101, an offload determination and instruction unit 102, an input processing start and stop unit 103, a response time period estimation unit 104, and a processor scheduling unit 105.

The sub processor 2 includes an input interrupt reception unit 201, an offload determination and instruction unit 202, an input processing start and stop unit 203, a response time period estimation unit 204, and a processor scheduling unit 205. Here, the main processor 1 executes the application 1a, and the sub processor 2 executes the input processing 2a.

A processor performance information control table 301, a processor operation information control table 302, an offload execution processor control table 303, an input device attribute table 304, and an offload allowing processing control table 305 are stored in the main memory 3.

Here, an I-O device 61 is connected to the I-O bus 5 via an I-O control device 62. In addition, the I-O device 61 and the I-O control device 62 correspond to the input apparatus or the sensor 6. Note that the individual blocks in the main processor 1, the sub processor 2, and the main memory 3 will be described later with reference to FIG. 6 that illustrates an example of the arithmetic processing system according to the present embodiment.

Figure 6:
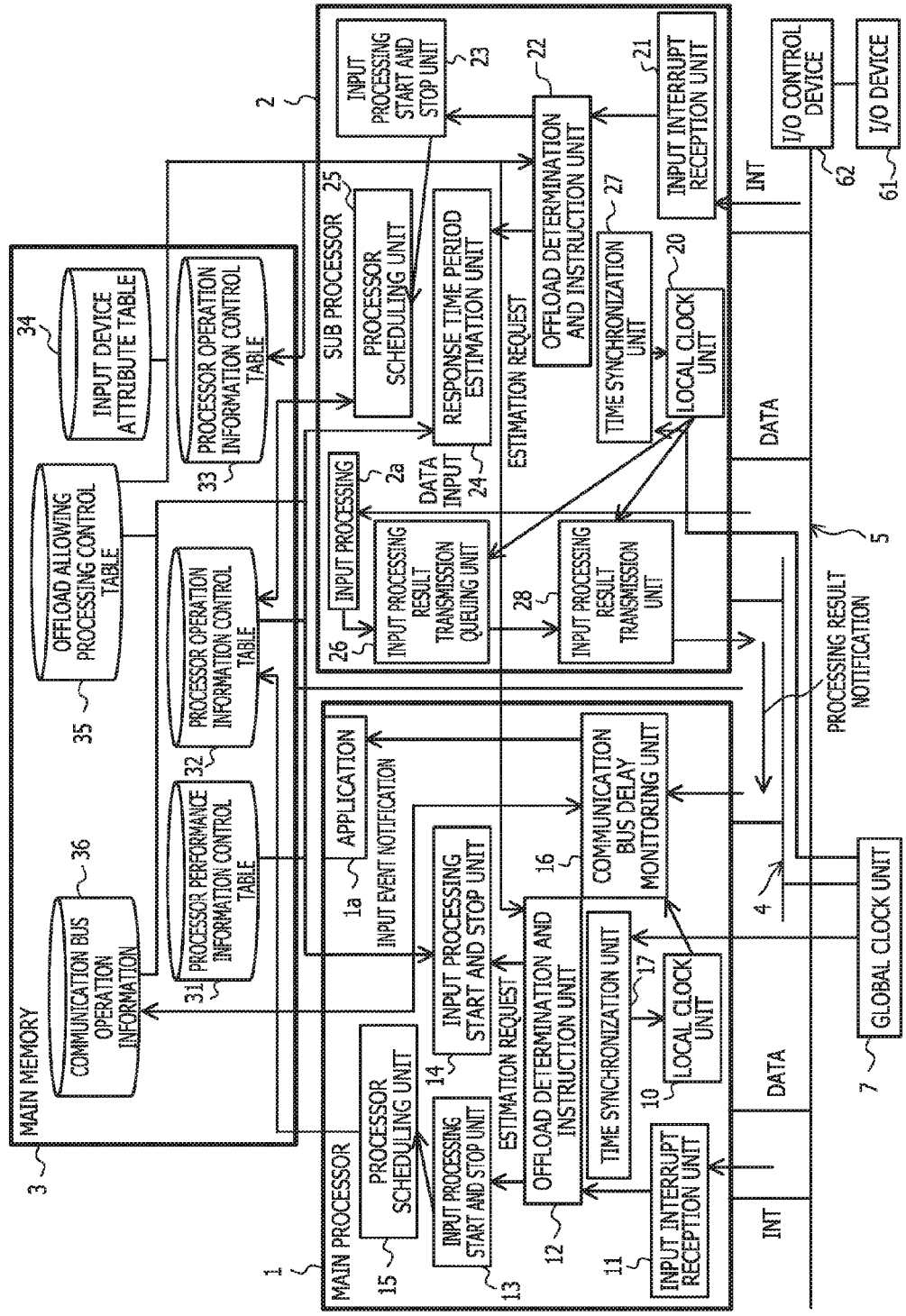
FIG. 6 is a block diagram illustrating an example of an arithmetic processing system according to the present embodiment.

Hereinafter, examples of the arithmetic processing system and the control method for the arithmetic processing system will be described in detail with reference to accompanying drawings. FIG. 6 is a block diagram illustrating an example of the arithmetic processing system according to the present embodiment.

As illustrated in FIG. 6, the main processor 1 includes a local clock unit 10, an input interrupt reception unit 11, an offload determination and instruction unit 12, an input processing start and stop unit 13, and a response time period estimation unit (a first response time period estimation unit) 14. Furthermore, the main processor 1 includes a processor scheduling unit 15, a communication bus delay monitoring unit 16, and a time synchronization unit 17.

The sub processor 2 includes a local clock unit 20, an input interrupt reception unit 21, an offload determination and instruction unit 22, an input processing start and stop unit 23, a response time period estimation unit (a second response time period estimation unit) 24, and a processor scheduling unit 25. Furthermore, the sub processor 2 includes an input processing result transmission queuing unit 26, an input processing result transmission unit 28, and a time synchronization unit 27. Here, the main processor 1 executes the application 1a, and the sub processor 2 performs the input processing 2a.

A processor performance information control table 31, a processor operation information control table 32, an offload execution processor control table 33, an input device attribute table 34, an offload allowing processing control table 35, and a communication bus operation information 36 are stored in the main memory 3.

Here, a global clock unit 7 is connected to the communication bus 4, and a global clock from the global clock unit 7 is supplied to the time synchronization unit 17 in the main processor 1 and the time synchronization unit 27 in the sub processor 2.

In addition, the I-O device 61 is connected to the I-O bus 5 via the I-O control device 62. The I-O device 61 and the I-O control device 62 correspond to, for example, the input apparatus or the sensor 6 in the above-mentioned FIG. 1.

Note that the blocks 101 to 105 in the main processor 1, the blocks 201 to 205 in the sub processor 2, and the tables 301 to 305 in the main memory 3 in the above-mentioned FIG. 5 correspond to the blocks 11 to 15, the blocks 21 to 25, and the tables 31 to 35, respectively, in FIG. 6.

Figure 7:
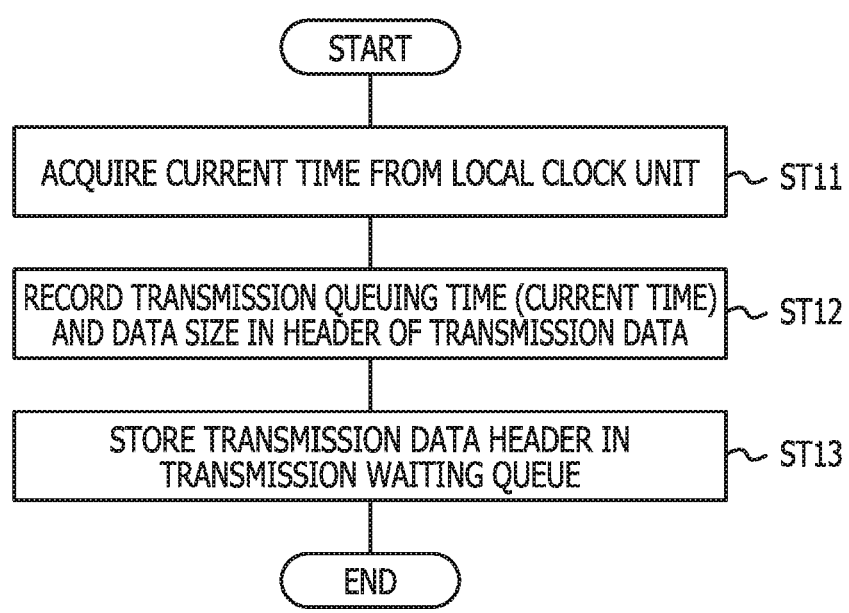
FIG. 7 is a flowchart for explaining an example of processing in an input processing result transmission queuing unit in a sub processor in the arithmetic processing system illustrated in FIG. 6.

FIG. 7 is a flowchart for explaining an example of processing in the input processing result transmission queuing unit in the sub processor in the arithmetic processing system illustrated in FIG. 6. As illustrated in FIG. 7, if transmission queuing processing for an input processing result, based on the input processing result transmission queuing unit 26 in the sub processor 2, is started, in ST11 a current time is acquired from the local clock unit 20, and the processing proceeds to ST12.

In ST12, a transmission queuing time (the acquired current time) and a data size of transmission data are recorded in a header of the transmission data. Furthermore, the processing proceeds to ST13, the transmission data header is stored in a transmission waiting queue, and the transmission queuing processing for the input processing result is terminated.

In other words, while, in order to transmit, to the main processor 1, the input processing result processed by the input processing 2a in the sub processor 2, the transmission data thereof is stored in the transmission waiting queue, a time at that time point is recorded, as a transmission queuing time, in the header of the transmission data.

Figure 8:
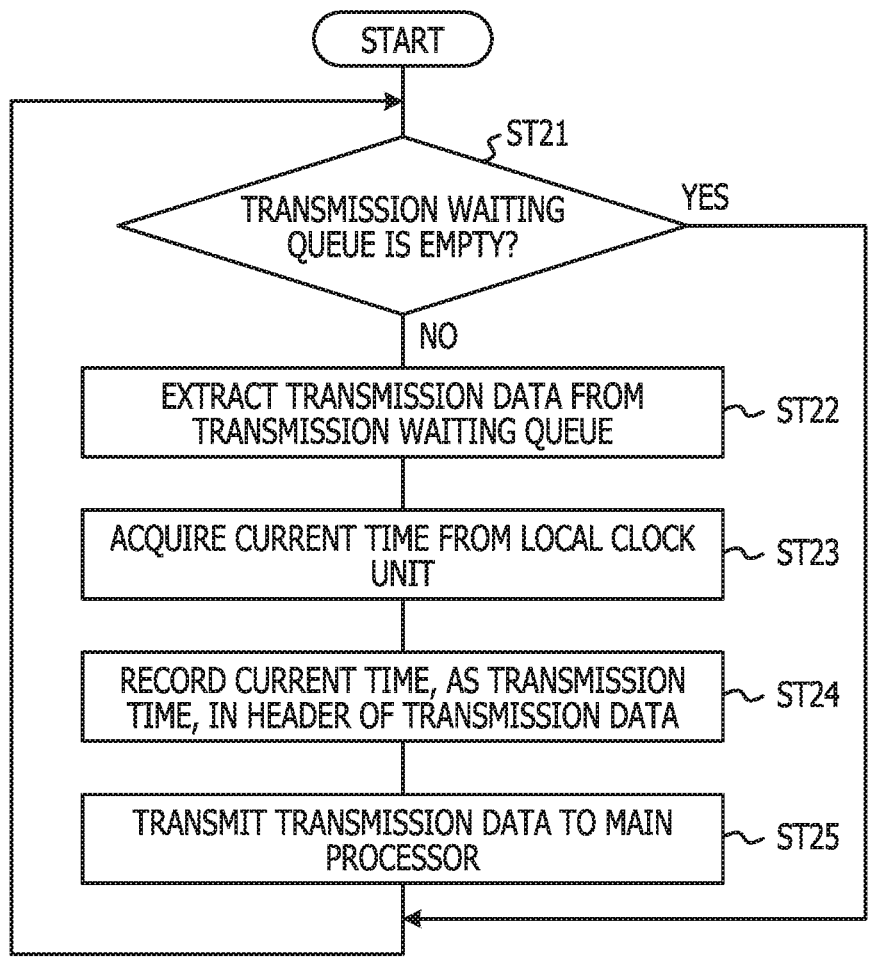
FIG. 8 is a flowchart for explaining an example of processing in an input processing result transmission unit in the sub processor in the arithmetic processing system illustrated in FIG. 6.

FIG. 8 is a flowchart for explaining an example of processing in the input processing result transmission unit in the sub processor in the arithmetic processing system illustrated in FIG. 6. As illustrated in FIG. 8, if transmission processing for an input processing result, based on the input processing result transmission unit 28 in the sub processor 2, is started, in ST21 it is determined whether the transmission waiting queue is empty.

If, in ST21, it is determined that the transmission waiting queue is not empty, in other words, transmission data is stored in the transmission waiting queue, the processing proceeds to ST22, the transmission data is extracted from the transmission waiting queue, and the processing proceeds to ST23.

In ST23 a current time is acquired from the local clock unit 20, the processing proceeds to ST24, and the current time is recorded, as a transmission time, in a header of the transmission data. Furthermore, the processing proceeds to ST25, the transmission data is transmitted, as a processing result notification, to the communication bus delay monitoring unit 16 in the main processor 1 via the communication bus 4, and the transmission processing for the input processing result is terminated.

Note that if, in ST21, it is determined that the transmission waiting queue is empty, in other words, no transmission data is stored in the transmission waiting queue, the processing is repeated until it is determined that the transmission waiting queue is not empty.

In other words, in the sub processor 2, to transmit data queued in the transmission waiting queue, the input processing result transmission unit 28 records, as the transmission time, a time at that time point in the header of the transmission data.

Figure 9:
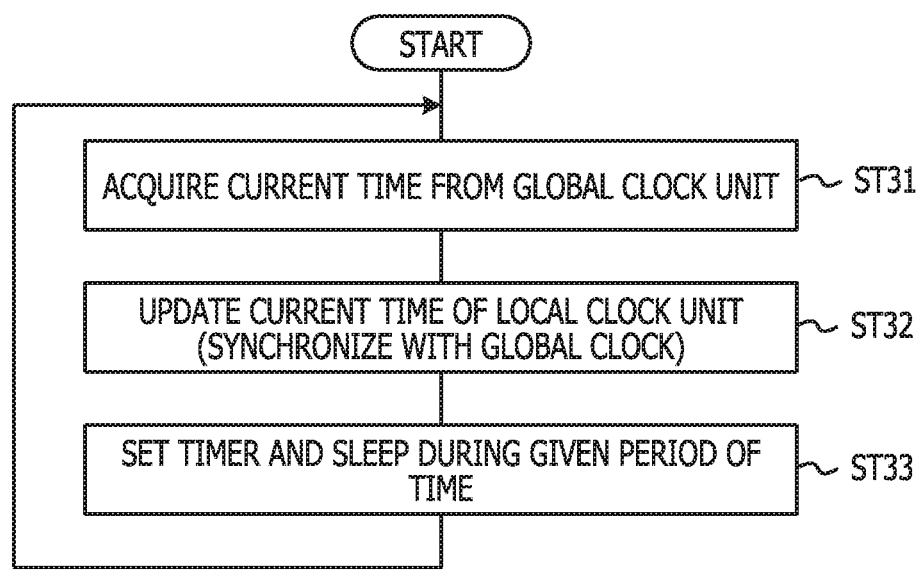
FIG. 9 is a flowchart for explaining an example of processing in a time synchronization unit in each of the sub processor and a main processor in the arithmetic processing system illustrated in FIG. 6.

FIG. 9 is a flowchart for explaining an example of processing in the time synchronization unit in each of the sub processor and the main processor in the arithmetic processing system illustrated in FIG. 6. Here, the time synchronization unit 17 in the main processor 1 and the time synchronization unit 27 in the sub processor 2 perform substantially the same processing operations.

Note that while, in the description of FIG. 9, time synchronization processing based on the time synchronization unit 27 in the sub processor 2 will be described, the same applies to time synchronization processing based on the time synchronization unit 17 in the main processor 1. In other words, as illustrated in FIG. 9, if the time synchronization processing based on the time synchronization unit 27 in the sub processor 2 is started, in ST31 a current time is acquired from the global clock unit 7 via the communication bus 4, and the processing proceeds to ST32.

In ST32, a current time of the local clock unit 20 is updated (a local clock is synchronized with the global clock). In addition, the processing proceeds to ST33, a timer is set, and the processing sleeps during a given period of time. Furthermore, the processing returns to ST31, and the same processing operations are repeated.

Note that, in the time synchronization processing based on the time synchronization unit 17 in the main processor 1, the local clock unit 20 in the sub processor 2 in the above-mentioned ST32 only has to be replaced with the local clock unit 10 in the main processor 1.

In other words, the time synchronization units 17 and 27 each periodically acquire a time from the global clock unit 7 and each update the local clock thereof so that a time of the local clock held by each of the main processor 1 and the sub processor 2 is not deviated. From this, it becomes possible to correctly measure a delay time period in communication between the main processor 1 and the sub processor 2.

Here, the global clock unit 7 is, for example, a hardware clock function module held by the arithmetic processing system, is connected to the communication bus 4, and is used for enabling a current time common in the system to be acquired by being accessed from each of the processors 1 and 2.

In addition, the local clock units 10 and 20 are hardware clock function modules held by the respective processors 1 and 2, and the processors 1 and 2 are able to acquire current times at high rates by accessing the respective local clock units 10 and 20 embedded therein.

Figure 10:
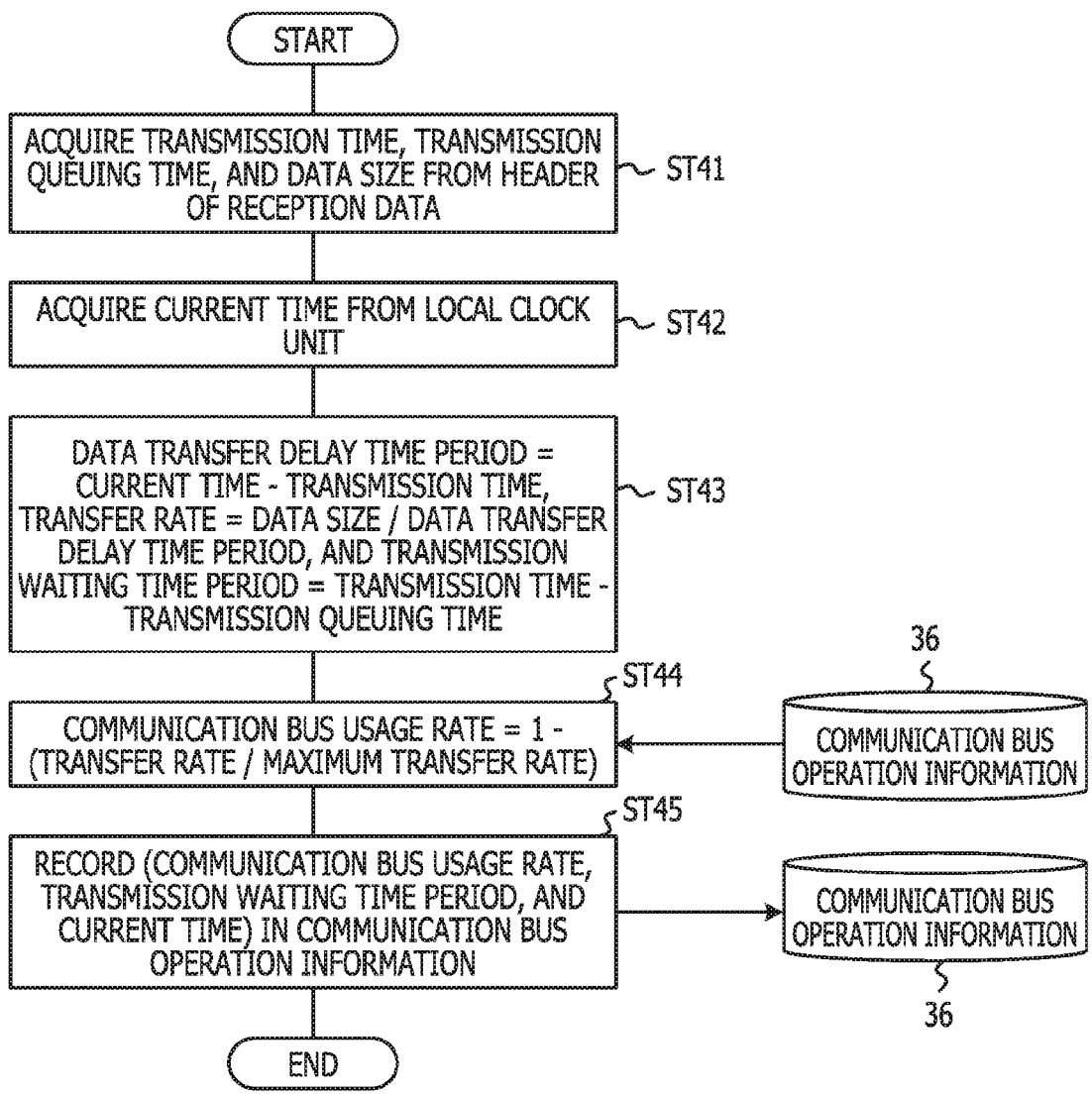
FIG. 10 is a flowchart for explaining an example of processing in a communication bus delay monitoring unit in the main processor in the arithmetic processing system illustrated in FIG. 6.

FIG. 10 is a flowchart for explaining an example of processing in the communication bus delay monitoring unit in the main processor in the arithmetic processing system illustrated in FIG. 6. As illustrated in FIG. 10, if communication bus delay monitoring processing based on the communication bus delay monitoring unit 16 in the main processor 1 is started, in ST41 a transmission time, a transmission queuing time, and a data size are acquired from a header of reception data.

In other words, the communication bus delay monitoring unit 16 receives the reception data (a processing result notification) from the sub processor 2 via the communication bus 4 and acquires the transmission time, the transmission queuing time, and the data size recorded in that header, and the processing proceeds to ST42.

In ST42, a current time is acquired from the local clock unit 10, and the processing further proceeds to ST43. In ST43, a data transfer delay time period=the current time−the transmission time, a transmission time transfer rate=the data size/the data transfer delay time period, and a transmission waiting time period=the transmission time−the transmission queuing time are obtained, and the processing proceeds to ST44.

In ST44, data is read from the communication bus operation information 36, and a communication bus usage rate=1−(a transfer rate/a maximum transfer rate) is obtained. The processing further proceeds to ST45, (the communication bus usage rate, the transmission waiting time period, and the current time) are written into the communication bus operation information 36, and the communication bus delay monitoring processing based on the communication bus delay monitoring unit 16 is terminated.

In other words, in ST44 and ST45, the communication bus delay monitoring unit 16 performs reading and writing of data on the communication bus operation information 36 in the main memory 3 via the communication bus 4.

From this, at the time of data communication between the main processor 1 and the sub processor 2, it is possible to measure and record the data transfer delay time period (communication delay time period) via the communication bus 4, the transmission waiting time period (a transmission queuing waiting time period), and the communication bus usage rate (a bus usage rate).

FIG. 11 is a flowchart for explaining an example of processing in the response time period estimation unit in the main processor in the arithmetic processing system illustrated in FIG. 6. As illustrated in FIG. 11, response time period estimation processing based on the response time period estimation unit (a first response time period estimation unit) 14 in the main processor 1 is started, in ST51 it is determined whether a current time>a communication recording time+a communication recording time threshold value holds.

If, in ST51, it is determined that the current time>the communication recording time+the communication recording time threshold value holds, the processing proceeds to ST52, the communication bus usage rate=a usage rate default value is defined, and the processing proceeds to ST54.

On the other hand, in ST51, it is determined that the current time>the communication recording time+the communication recording time threshold value does not hold, the processing proceeds to ST53, the communication bus usage rate=a most recently recorded usage rate value is defined, and the processing proceeds to ST54. Note that, in the determination processing in ST51, the response time period estimation unit 14 reads, via the communication bus 4, data from the communication bus operation information 36 stored in the main memory 3.

In ST54, an estimated current time of each of functions=a communication time period+a calculation time period and the communication time period=an output data amount/(1−the communication bus usage rate)*a maximum communication rate+the transmission waiting time period are obtained. In addition, in ST54, a main processor calculation time period=a main processor calculation amount/(1−a main processor usage rate)*a main processor calculation rate is obtained. Furthermore, in ST54, a sub processor calculation time period=a sub processor calculation amount/(1−a sub processor usage rate)*a sub processor calculation rate is obtained.

Note that, in ST54, pieces of data are read, via the communication bus 4, from the processor performance information control table 31, the offload allowing processing control table 35, and the communication bus operation information 36, stored in the main memory 3, thereby performing the processing. In addition, the processing proceeds to ST55, an estimated response time period (a first estimated response time period)=the sum of estimated response time periods of respective functions is defined, and the response time period estimation processing based on the response time period estimation unit 14 is terminated.

In other words, based on the usage rate of the communication bus 4 between the main processor 1 and the sub processor 2, the response time period estimation unit 14 in the main processor 1 estimates a response time period when the input processing 2a is performed by the sub processor 2.

Here, it is assumed that the response time period when the input processing 2a is performed by the sub processor 2 is a time period until the application 1a on the main processor 1 is notified of an input event. Note that the response time period estimation unit (the second response time period estimation unit) 24 in the sub processor 2 is substantially the same as the response time period estimation unit (the first response time period estimation unit) 14 in the main processor 1, and the description thereof will be omitted.

FIG. 12 is a flowchart for explaining an example of processing in the offload determination and instruction unit in the main processor in the arithmetic processing system illustrated in FIG. 6. As illustrated in FIG. 12, if offload determination and instruction processing based on the offload determination and instruction unit 12 in the main processor 1 is started, in ST61 an offload allowing processing list is initialized, and the processing proceeds to ST62.

In ST62 a function ID(i) serving as an offload candidate is sequentially extracted (read) starting from the final row of the offload allowing processing control table 35 stored in the main memory 3, and the processing proceeds to ST63, thereby estimating a response time period.

The processing further proceeds to ST64, and it is determined whether an estimated response time period<a first requested response time period holds. Note that, in the determination processing in ST64, the offload determination and instruction unit 12 reads, via the communication bus 4, data from the input device attribute table 34 stored in the main memory 3.

If, in ST64, it is determined that the estimated response time period<the first requested response time period holds, the processing proceeds to ST65, thereby adding the relevant function ID (a relevant functional processing operation) to the offload allowing processing list, and the processing further proceeds to ST66.

On the other hand, if, in ST64, it is determined that the estimated response time period<the first requested response time period does not hold, the processing proceeds to ST66 without change. Note that, in the processing operation in ST65, the offload determination and instruction unit 12 writes, via the communication bus 4, data into the offload execution processor control table 33 stored in the main memory 3.

In ST66, it is determined whether extraction of all function IDs is completed, and if it is determined that the extraction of all the function IDs is completed, the processing proceeds to ST67. Note that if, in ST66, it is determined whether extraction of all the function IDs is not completed, the processing returns to ST62, and the same processing operations are repeated.

In ST67, it is determined whether the offload allowing processing list is empty, and if it is determined that the offload allowing processing list is empty, the processing proceeds to ST68. In addition, if it is determined that the offload allowing processing list is not empty, the processing proceeds to ST69.

In ST68, offload allowing processing in the sub processor 2 is stopped under the assumption that offload is not allowed, offload allowing processing is started in the main processor 1, and the offload determination and instruction processing based on the offload determination and instruction unit 12 is terminated.

On the other hand, in ST69, the offload allowing processing in the main processor 1 is stopped under the assumption that offload is allowed, the offload allowing processing is started in the sub processor 2, and the offload determination and instruction processing based on the offload determination and instruction unit 12 is terminated.

In this way, based on the estimated response time periods and requested response time periods of individual devices, the offload determination and instruction unit 12 in the main processor 1 determines whether it is possible to offload the input processing (2a) to the sub processor 2, and based on the result thereof, the offload determination and instruction unit 12 in the main processor 1 instructs to start or stop the input processing.

In other words, in a case where the first estimated response time period falls within the first requested response time period, the input processing is caused to operate in the power saving sub processor 2, and in a case where the first estimated response time period does not fall within the first requested response time period, the input processing is caused to operate in the main processor 1.

FIG. 13 is a flowchart for explaining an example of processing in the offload determination and instruction unit in the sub processor in the arithmetic processing system illustrated in FIG. 6. As is clear from a comparison between FIG. 13 and the above-mentioned FIG. 12, offload determination and instruction processing based on the offload determination and instruction unit 22 in the sub processor 2 is substantially the same as the offload determination and instruction processing based on the offload determination and instruction unit 12 in the main processor 1.

In other words, as illustrated in FIG. 13, if the offload determination and instruction processing based on the offload determination and instruction unit 22 in the sub processor 2 is started, in ST71 the offload allowing processing list is initialized, and the processing proceeds to ST72.

In ST72 a function ID(i) serving as an offload candidate is sequentially extracted starting from the final row of the offload allowing processing control table 35 stored in the main memory 3, and the processing proceeds to ST73, thereby estimating a response time period.

The processing further proceeds to ST74, and it is determined whether an estimated response time period<a second requested response time period holds. Note that, in the determination processing in ST74, the offload determination and instruction unit 22 reads, via the communication bus 4, data from the input device attribute table 34 stored in the main memory 3.

If, in ST74, it is determined that the estimated response time period<the second requested response time period holds, the processing proceeds to ST75, thereby adding the relevant function ID to the offload allowing processing list, and the processing further proceeds to ST76.

On the other hand, if, in ST74, it is determined that the estimated response time period<the second requested response time period does not hold, the processing proceeds to ST76 without change. Note that, in the processing operation in ST75, the offload determination and instruction unit 22 writes, via the communication bus 4, data into the offload execution processor control table 33 stored in the main memory 3.

In ST76, it is determined whether extraction of all function IDs (all functional processing operations) is completed, and if it is determined that the extraction of all the function IDs is completed, the processing proceeds to ST77. Note that if, in ST76, it is determined whether extraction of all the function IDs is not completed, the processing returns to ST72, and the same processing operations are repeated.

In ST77, it is determined whether the offload allowing processing list is empty, and if it is determined that the offload allowing processing list is empty, the processing proceeds to ST78. In addition, if it is determined that the offload allowing processing list is not empty, the processing proceeds to ST79.

In ST78, the offload allowing processing in the sub processor 2 is stopped under the assumption that offload is not allowed, the offload allowing processing is started in the main processor 1, and the offload determination and instruction processing based on the offload determination and instruction unit 22 is terminated.

On the other hand, in ST79, the offload allowing processing in the main processor 1 is stopped under the assumption that offload is allowed, the offload allowing processing is started in the sub processor 2, and the offload determination and instruction processing based on the offload determination and instruction unit 22 is terminated.

In this way, the offload determination and instruction unit 22 in the sub processor 2 performs substantially the same processing as that in the offload determination and instruction unit 12 in the main processor 1. In other words, in a case where the estimated response time period falls within the requested response time period, the input processing is caused to operate in the power saving sub processor 2, and in a case where the estimated response time period does not fall within the requested response time period, the input processing is caused to operate in the main processor 1.

In the above description, it is desirable that the first requested response time period in ST64 in FIG. 12 is set shorter than the second requested response time period in ST74 in FIG. 13 by a predetermined margin a.

Here, the input interrupt reception unit 11 in the main processor 1 and the input interrupt reception unit 21 in the sub processor 2 are substantially equal to each other. In addition, the input interrupt reception unit 11 in the main processor 1 and the input interrupt reception unit 21 in the sub processor 2 each receive an interrupt notification (INT) at the time of operating an input device and call the offload determination and instruction units 12 and 22, respectively.

In addition, the input processing start and stop units 13 and 23 are substantially equal to each other and perform start and stop processing operations for the input processing on the main processor 1 and the sub processor 2, based on instructions from the offload determination and instruction units 12 and 22, respectively.

Furthermore, the processor scheduling units 15 and 25 are substantially equal to each other. In addition, the processor scheduling units 15 and 25 perform processing operations for sequentially assigning processing operations executable on the processors 1 and 2 to the processors 1 and 2, respectively, and causing the processing operations to be performed therein.

Note that the application 1a is a main body of a program used by the user who operates a mobile terminal (the arithmetic processing system) and is usually executed by the main processor 1. In addition, the input processing (2a) is a program for receiving data from, for example, an input device (the input apparatus, the sensor 6, or the I-O device 61), and performing post-processing operations such as correction and interpretation on the input data, and converting the input data into data available for use by the application 1a. This input processing is prepared in a format operable in each of the main processor 1 and the sub processor 2.

FIGS. 14A and 14B are diagrams for explaining examples of the communication bus operation information in the main memory in the arithmetic processing system illustrated in FIG. 6. Here, FIG. 14A illustrates an example of the communication bus operation information set at the time of start-up, and FIG. 14B illustrates an example of the communication bus operation information measured and updated during execution.

As illustrated in FIG. 14A, the communication bus operation information (36) set at the time of the start-up is defined as, for example, a maximum communication rate: 200 bytes/ms, a usage rate default value: 99%, and a communication recording time threshold value: 10000 ms.

These values illustrated in FIG. 14A correspond to data (the maximum transfer rate) read from the communication bus operation information 36 in the main memory 3 and set in, for example, ST44 in the above-mentioned FIG. 10. Note that in a case where no communication bus usage rate is measured for a while, it is difficult to estimate a communication time period. Therefore, it is desirable to estimate a large communication time period by using the default value.

As illustrated in FIG. 14B, the communication bus operation information (36) measured and updated during execution is defined as, for example, a communication bus usage rate: 50%, a communication recording time: 20000 ms, and a transmission waiting time period: 0.1 ms.

These values illustrated in FIG. 14B correspond to data written into the communication bus operation information 36 in the main memory 3 in, for example, ST45 in the above-mentioned FIG. 10. Note that, as for the values illustrated in FIG. 14B, the communication bus usage rate may be measured by, for example, the main processor 1 from a communication delay time period at the time of receiving data from the sub processor 2 and may be recorded, in such a manner as in FIG. 14B, along with a time (communication recording time) at the time of measurement.

Furthermore, a maximum communication rate of the communication bus between the main processor and the sub processor, used for measuring the communication bus usage rate, may be measured, and a time period taken for waiting transmission in a transmission queue may be measured as a transmission waiting time period and may be recorded in such a manner as in FIG. 14B.

FIG. 15 is a diagram for explaining an example of the offload allowing processing control table in the main memory in the arithmetic processing system illustrated in FIG. 6 and illustrates an example in a case where the input processing is pipeline processing (functions A to E). In, for example, ST62 in the above-mentioned FIG. 12, the offload allowing processing control table 35 is read and imported by the offload determination and instruction unit 12.

As illustrated in FIG. 15, the calculation amounts of the main and sub processors for, for example, individual function IDs (for example, input processing from the I-O device 61: functional processing operations A, B, C, D, and E) and input and output data amounts thereof are recorded in the offload allowing processing control table 35.

In other words, calculation amounts (the number of instructions) in a case where, for example, individual input processing functions able to be offloaded to the sub processor 2 are performed by the main processor 1 and calculation amounts in a case where the individual input processing functions able to be offloaded to the sub processor 2 are performed by the processor 2 are recorded in the offload allowing processing control table 35.

Furthermore, input data amounts (byte) and output data amounts between the main processor 1 and the sub processor 2 are recorded in the offload allowing processing control table 35. Here, the offload allowing processing control table 35 is arranged so that offload allowing processing candidates are sequentially defined starting from, for example, the final row (the bottom) thereof.

In other words, the function ID of the final row indicates an input processing function from the input device (the I-O device), and a gathering of function IDs (for example, E, C to E, or A to E) of successive rows starting from the function of the final row is a gathering of processing operations able to be offloaded.

Specifically, assignment such as, for example, processing the functions (processing operations) A to D in the main processor 1 and processing the function E in the sub processor 2 (offload processing) or processing the functions A and B in the main processor 1 and processing the functions C to E in the sub processor 2 is performed. Alternatively, assignment such as, for example, processing, as offload processing operations, all the functions A to E in the sub processor 2 is performed.

Note that in a case where, for example, all the functions A to E are subjected to offload processing in the sub processor 2, the output data amount (200 bytes) of A is a data amount to be transferred in communication between the main processor 1 and the sub processor 2.

FIG. 16 is a diagram for explaining an example of the input device attribute table in the main memory in the arithmetic processing system illustrated in FIG. 6. As illustrated in FIG. 16, for example, the first requested response time period used in ST64 in the above-mentioned FIG. 12 and the second requested response time period used in ST74 in the above-mentioned FIG. 13 are recorded in the input device attribute table 34.

Specifically, for example, the first requested response time period is set to 4.0 ms by subtracting the margin (a) of 0.5 ms from 4.5 ms serving as the second requested response time period. In other words, in a case where, for example, the functions A to E are subjected to offload processing in the sub processor 2, the predetermined margin a is given, and a stable operation is performed by reducing movement (return) of processing from the sub processor 2 to the main processor 1.

Here, a response time period desirable for securing operation performance, in other words, a time period until a result obtained by the user operating the input device is notified to an application program is preliminarily set in the input device attribute table 34. Note that the first requested response time period and the second requested response time period are set to, for example, respective characteristic values for each of types of device.

FIG. 17 is a diagram for explaining an example of the offload execution processor control table in the main memory in the arithmetic processing system illustrated in FIG. 6. As illustrated in FIG. 17, for example, a current execution processor (the main processor 1 (Main) or the sub processor 2 (Sub)) of each of the function IDs of the input processing is stored in the offload execution processor control table 33.

FIG. 18 is a diagram for explaining an example of the processor performance information control table in the main memory in the arithmetic processing system illustrated in FIG. 6. As illustrated in FIG. 18, for example, calculation processing performance (a calculation rate: the number of instructions/ms) of each of types of processor (the main processor 1 and the sub processor 2) is stored in the processor performance information control table 31

FIG. 19 is a diagram for explaining an example of the processor operation information control table in the main memory in the arithmetic processing system illustrated in FIG. 6. As illustrated in FIG. 19, along with the busy time period (a Busy time period (ms)) and the idle time period (an Idle time period (ms)), for example, a usage rate (%) of each of types of processor (the main processor 1 and the sub processor 2) is stored in the processor operation information control table 32.

As described above, in the arithmetic processing system according to the present embodiment, a usage state of the communication bus 4 is measured and recorded at the time of data communication between the main processor 1 and the sub processor 2, and a time period taken for data communication between the main processor 1 and the sub processor 2 after that is estimated.

In other words, a bus usage rate is obtained by monitoring traffic of the communication bus 4, and a time period taken for communication after that is estimated. In addition, a congestion state of the communication bus 4 is understood by monitoring a delay time period of data communication between the main processor 1 and the sub processor 2, and a time period taken for communication after that is estimated. Furthermore, based on the usage rate of the communication bus 4 between the main processor 1 and the sub processor 2, a response time period in a case of performing, in the sub processor 2, an input processing operation able to be offloaded.

In addition, in a case where the estimated response time period in a case of being performed by the sub processor 2 is able to satisfy the first requested response time period of the input device (the I-O device 61), the corresponding input processing operation is stopped in a case of being performed by the main processor 1 and is caused to be performed by the sub processor 2.

On the other hand, in a case where the estimated response time period in a case of being performed by the sub processor 2 does not satisfy the second requested response time period of the input device, the corresponding input processing operation is stopped in a case of being performed by the sub processor 2 and is caused to be performed by the main processor 1.

In this way, in the present embodiment, in a device equipped with, for example, a main processor and a power saving sub processor, as much input processing as possible is offloaded to the sub processor. From this, it becomes possible to reduce power consumption by reducing the operation time period (processing amount) of the main processor while satisfying a restriction of a response time period.

Figure 20:
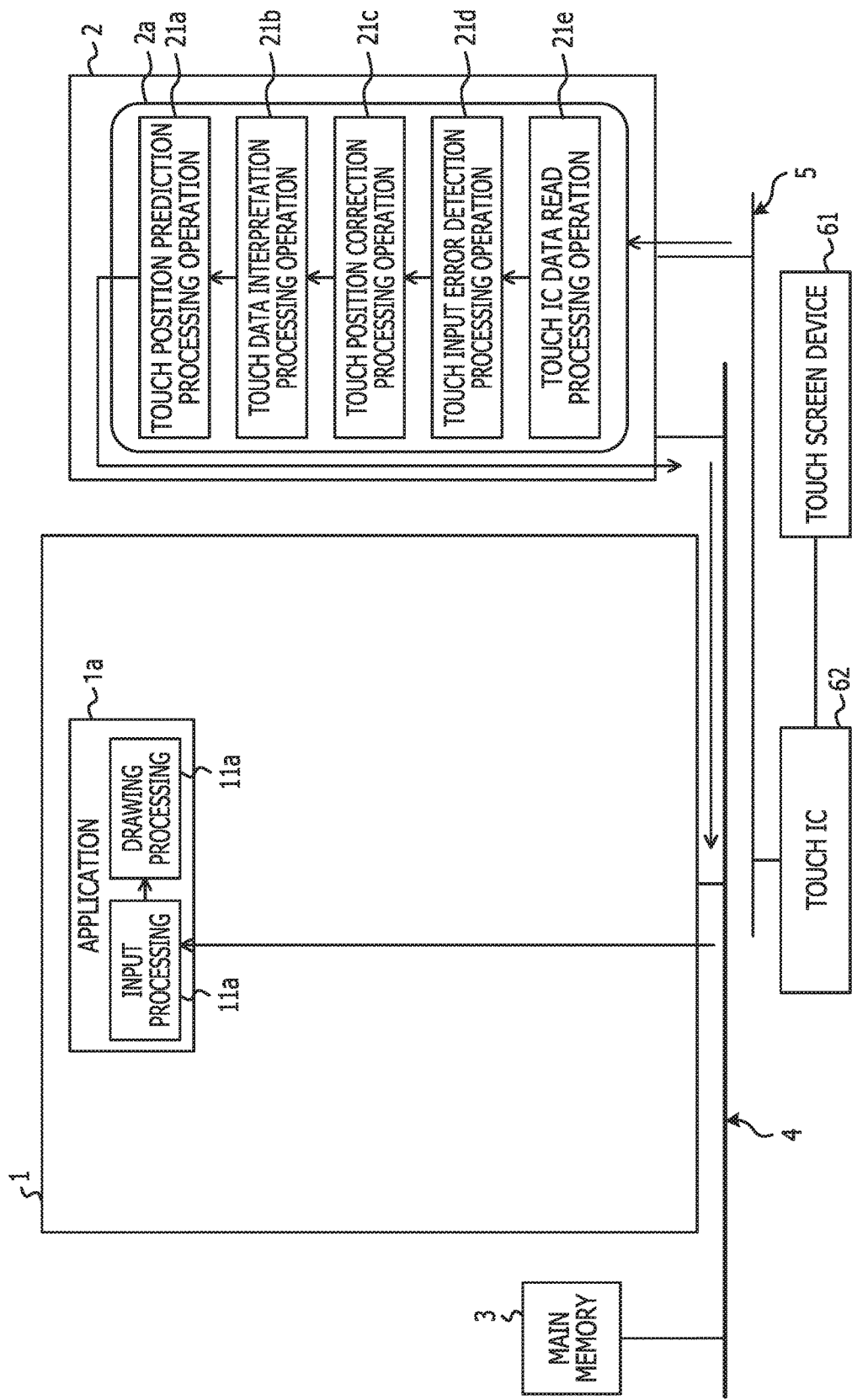
FIG. 20 is a diagram for explaining an example (a first example) in which touch input processing is performed based on an arithmetic processing system according to the present embodiment.
Figure 21:
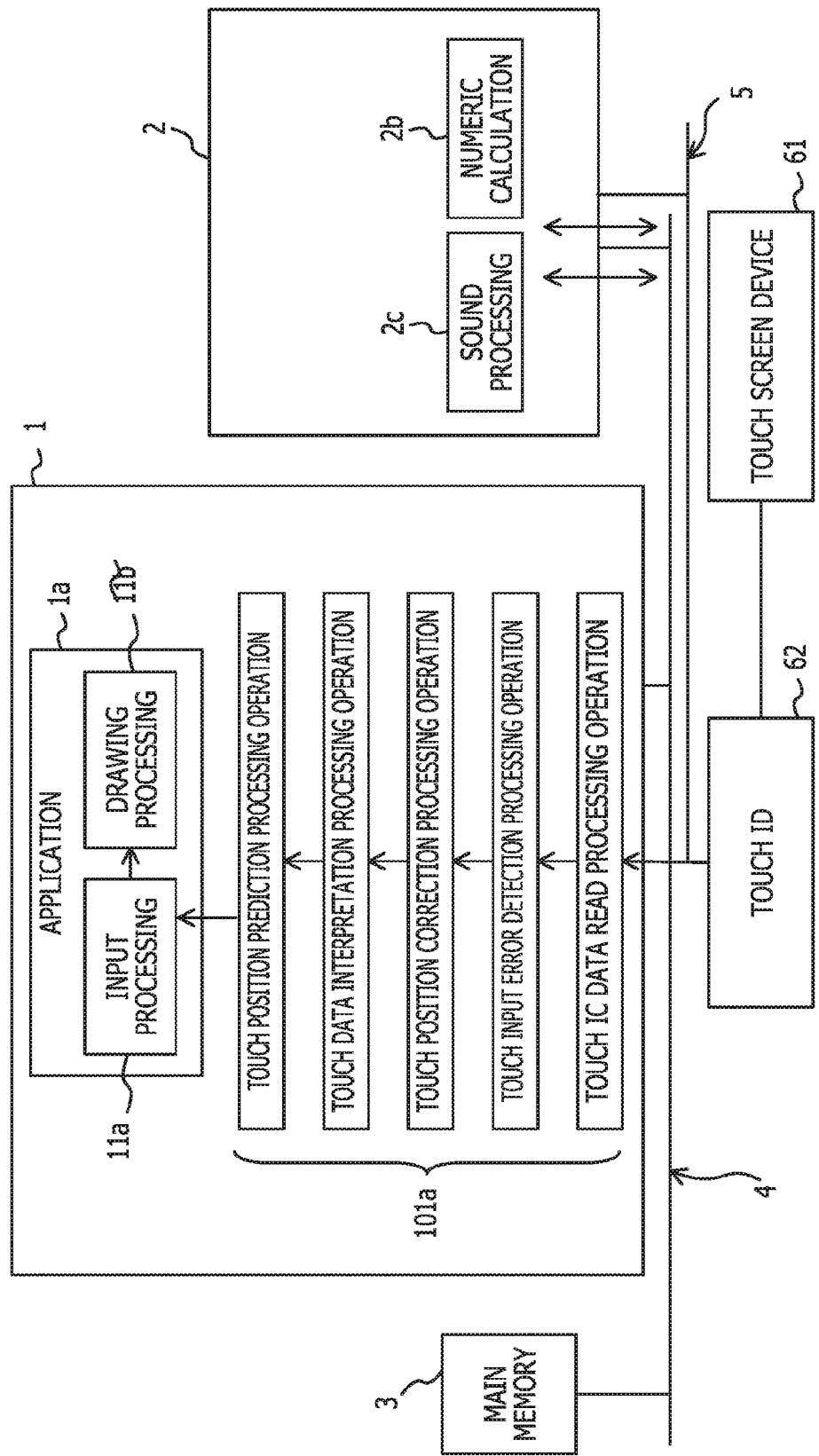
FIG. 21 is a diagram for explaining an example (a second example) in which the touch input processing is performed based on the arithmetic processing system according to the present embodiment.

FIG. 20 and FIG. 21 are diagrams for explaining examples in which touch input processing is performed based on the arithmetic processing system according to the present embodiment, and FIG. 20 and FIG. 21 are used for explaining a case where the I-O device 61 and the I-O control device 62 in FIG. 6 are a touch screen device and a touch IC, respectively.

Here, FIG. 20 illustrates an example of an operation in a case where, for example, the usage rate of the communication bus 4 is low and it is possible to send an input notification to the application 1*a* within a requested response time period (for example, a drawing frame rate: 16.6 ms) even if the touch input processing (2*a*) is offloaded to the sub processor 2.

In addition, FIG. 21 illustrates an example of an operation in a case where the usage rate of the communication bus 4 increases due to, for example, a factor that the sub processor 2 performs other processing operations such as, for example, the sound processing 2*c* and the numeric calculation 2*b* and it is difficult to send an input notification to the application 1*a* within a response time period if being offloaded to the sub processor 2.

Note that while, in FIG. 20 and FIG. 21, portions other than the proper portion of a touch input processing system are omitted, the main processor 1, the sub processor 2, and the main memory 3 are substantially the same as those in the descriptions with reference to FIG. 6 to FIG. 19.

As illustrated in FIG. 20 and FIG. 21, a touch screen device 61 (the input device) on which the user performs a touch operation is connected to the I-O bus 5 via a touch IC 62.

Here, in the present system, it is desirable that a touch screen operation performed by, for example, the user who uses the touch screen device 61 is processed, is transmitted, as input information for the application 1*a*, within a given period of time, and is reflected in an operation such as drawing processing in the application 1*a*. In addition, if the user performs the touch operation, the touch IC 62 notifies the processors 1 and 2 of interrupts (INTs).

Here, in a case where the drawing frame rate of the touch screen device 61 is 16.6 ms, in consideration of various circuits, various processing operations, and so forth in the main processor 1 and the sub processor 2 it is desirable to set the first requested response time period to, for example, about 4.0 ms.

In addition, as described above, it is desirable to set the second requested response time period to about 4.5 ms obtained by adding the predetermined margin a (for example, 0.5 ms) to the first requested response time period. Note that the first and second requested response time periods are set to respective characteristic values, based on the type of input device, a function ID (processing operation), and so forth.

In addition, in a case where an estimated response time period in a case of being performed by the sub processor 2 is able to satisfy the first requested response time period (for example, 4.0 ms) (is shorter than, for example, 4.0 ms), the corresponding input processing 2*a* is caused to be performed by the sub processor 2. In other words, as illustrated in FIG. 20, in the sub processor 2, data is read from the touch IC 62, and furthermore, post-processing is performed.

The post-processing of the input processing 2*a* includes, for example, a touch IC data read processing operation 21*e*, a touch input error detection processing operation 21*d*, a touch position correction processing operation 21*c*, a touch data interpretation processing operation 21*b*, and a touch position prediction processing operation 21*a*. Furthermore, a result of the input processing 2*a* based on the sub processor 2 is notified to input processing 11*a* in the application 1*a* in the main processor 1 via the communication bus 4.

Here, the above-mentioned series of post-processing operations is sequentially processed for input data in such a manner as in, for example, pipeline processing, thereby being converted into a data format to be notified to the application 1*a*. In addition, as described above, according to the present embodiment, the series of post-processing operations is caused to be offloaded to the sub processor 2 and to be performed as long as a response time period (the first requested response time period) is satisfied, and accordingly, it becomes possible to reduce power consumption while maintaining operation performance.

On the other hand, in a case where an estimated response time period in a case of being performed by the sub processor 2 is unable to satisfy the second requested response time period of the touch screen device 61 (is longer than, for example, 4.5 ms), corresponding input processing 101*a* (corresponding to 2*a*) is caused to be performed by the main processor 1.

As illustrated in, for example, FIG. 21, in a case where the sub processor 2 performs the sound processing 2*c* or the numeric calculation 2*b* and it is difficult to send an input notification to the application 1*a* within a response time period if offloading to the sub processor 2, the input processing 101*a* is caused to be performed by the main processor 1. In other words, as illustrated in FIG. 21, in the main processor 1, data is read from the touch IC 62, and furthermore, the post-processing 101*a* is performed.

Note that the post-processing (the input processing 101*a*) is the same as the post-processing operations 21*e* to 21*a* described above in FIG. 20 and includes, for example, a touch IC data read processing operation 101*e*, a touch input error detection processing operation 101*d*, a touch position correction processing operation 101*c*, a touch data interpretation processing operation 101*b*, and a touch position prediction processing operation 101*a*. In addition, a result of the input processing 101*a* based on the main processor 1 is notified to the input processing 11*a* in the application 1*a* without change.

FIG. 22 is a diagram for explaining an example of the offload allowing processing control table in the main memory in a case of performing the touch input processing illustrated in each of FIG. 20 and FIG. 21. As illustrated in FIG. 22, for example, calculation processing performance (a calculation rate: the number of instructions/ms) of each of types of processor (the main processor 1 and the sub processor 2) is stored in the offload allowing processing control table 35.

As is clear from a comparison between the FIG. 22 and the above-mentioned FIG. 15, in FIG. 22 the touch position prediction processing operation 101a, the touch data interpretation processing operation 101b, the touch position correction processing operation 101c, the touch input error detection processing operation 101d, and the touch IC data read processing operation 101e are set to the functions ID A to E, respectively. Note that, as described with reference to FIG. 15, the offload allowing processing control table 35 is arranged so that offload allowing processing candidates are sequentially defined starting from, for example, the final row thereof.

FIG. 23 is a diagram for explaining an example of the input device attribute table in the main memory in a case of performing the touch input processing illustrated in each of FIG. 20 and FIG. 21. As illustrated in FIG. 23, the first requested response time period and the second requested response time period for, for example, the touch input processing (touch) are recorded in the input device attribute table 34.

In other words, a response time period desirable for securing operation performance of, for example, the touch input processing (a time period until a result obtained by the user performing a touch operation is notified to the application 1a) is preliminarily set in the input device attribute table 34.

Specifically, in a case where image updating in which the touch operation is reflected corresponds to a drawing update interval (for example, 16.6 ms), the first requested response time period is set to, for example, 4.0 ms, and the second requested response time period is set to 4.5 ms in consideration of the predetermined margin a (for example, 0.5 ms). Note that, as described above, the first requested response time period and the second requested response time period are set to, for example, respective characteristic values for each of types of device.

The present embodiment is not limited to the above-mentioned examples, and control such as causing, for example, a main application program to operate in a power saving processor, offloading some processing operations to a high-performance processor, and adjusting performance and power consumption may be performed. In addition, even in a homogeneous parallel processor system in which the main processor 1 and the sub processor 2 are not different in processing capacity or power efficiency, it is possible to assign processing to each of the processors and to adjust performance and power consumption, by applying the present embodiment.

While the embodiments are described above, all examples and all conditions, described here, are described in order to help the present technology and the concept of the technically applied present technology to be understood, and the described examples and conditions are not intended to particularly restrict the scope of the present technology. In addition, such descriptions in the specification do not indicate advantages or disadvantages of the present technology. While the embodiments of the present technology are described in detail, it goes without saying that various modifications, replacements, and alternations may occur without departing from the spirit and scope of the present technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a first processor;
a second processor; and
a communication bus configured to couple the first processor and the second processor, wherein
the first processor is configured to
obtain a bus usage rate by monitoring a delay time period of data transfer in the communication bus,
determine whether to offload a processing on received data based on the monitored bus usage rate, and
offload the processing to the second processor when the processing is determined to be offloaded.

2. The system according to claim 1, wherein
the first processor is further configured to
estimate, based on the monitored bus usage rate, a response time period when the processing is performed in the second processor,
stop the processing when the estimated response time period satisfies a first requested response time period, and
offload the stopped processing on the received data to the second processor.

3. The system according to claim 2, wherein
the second processor is further configured to
acquire the bus usage rate obtained by monitoring a delay time period of data transfer in the communication bus,
estimate, based on the acquired bus usage rate, a response time period to respond result of the processing when the processing is performed in the second processor,
stop the processing when the estimated response time period does not satisfy a second requested response time period, and
offload the stopped processing to the first processor.

4. The system according to claim 3, wherein
the second requested response time period is set longer than the first requested response time period by a predetermined margin.

5. The system according to claim 1, wherein
the processing includes a plurality of functional processing operations to the received data, and
the processing performed by the first processor or the second processor includes performing part of the plurality of functional processing operations.

6. The system according to claim 1, further comprising:
a memory coupled to the communication bus, wherein
the memory is configured to store communication bus operation information indicating an operation of the communication bus, and
the first processor is further configured to update the communication bus operation information based on the obtained bus usage rate.

7. The system according to claim 1, wherein
the first processor consumes first consumed power to perform the processing, and
the second processor consumes second consumed power lower than the first consumed power to perform the processing.

8. The system according to claim 1, wherein
the second processor is further configured to add first time information to a transmission data which is to be transmitted to the first processor, the first time information indicating time at which the transmission data is prepared for transmitting to the first processor, and
the first processor is further configured to
acquire the first time information from the transmission data received from the second processor,
acquire second time information at which the first processor receives the transmission data from the second processor, and
monitor the delay time period of data transfer in the communication bus by based on the acquired first time information and the acquired second time information.

9. The system according to claim 8, wherein
the second processor is further configured to add data size information to the transmission data, the data size information indicating size of data included in the transmission data to be transmitted to the first processor, and
the first processor is further configured to
acquire the data size information of the transmission data received from the second processor, and
obtain the bus usage rate based on the acquired first time information, the acquired second time information and the acquired data size information.

10. A process control method comprising:
receiving, by a first processor, transmission data from a second processor which is coupled with the first processor via a communication bus;
obtaining, by the first processor, a bus usage rate by monitoring a delay time period to transfer the transmission data in the communication bus;
determining, by the first processor, whether to offload a processing on received data based on the monitored bus usage rate; and
offloading, by the first processor, the processing to the second processor when the processing is determined to be offloaded.

11. The method according to claim 10, further comprising:
estimating, by the first processor, a response time period when the processing is performed in the second processor based on the monitored bus usage rate;
stopping, by the first processor, the processing when the estimated response time period satisfies a first requested response time period; and
offloading, by the first processor, the stopped processing on the received data to the second processor.

12. The method according to claim 11, further comprising:
acquiring, by the second processor, the bus usage rate obtained by monitoring a delay time period of data transfer in the communication bus;
estimating, by the second processor, a response time period to respond result of the processing when the processing is performed in the second processor based on the acquired bus usage rate;
stopping, by the second processor, the processing when the estimated response time period does not satisfy a second requested response time period; and
offloading, by the second processor, the stopped processing to the first processor.

13. The method according to claim 12, wherein
the second requested response time period is set longer than the first requested response time period by a predetermined margin.

14. The method according to claim 10, wherein
the processing includes a plurality of functional processing operations to the received data, and
the processing performed by the first processor or the second processor includes performing part of the plurality of functional processing operations.

15. The method according to claim 10, further comprising:
storing, by the first processor, communication bus operation information in a memory, the communication bus operation information indicating an operation of the communication bus; and
updating, by the first processor, the communication bus operation information based on the obtained bus usage rate.

16. The method according to claim 10, wherein
the first processor consumes first consumed power to perform the processing; and
the second processor consumes second consumed power lower than the first consumed power to perform the processing.

17. A non-transitory computer readable medium having stored therein a program that causes a computer to execute a process, the process comprising:
acquiring transmission data transferred to a first processor from a second processor which is coupled with the first processor via a communication bus;
obtaining a bus usage rate by monitoring a delay time period to transfer the transmission data in the communication bus;
determining whether to offload, from the first processor, a processing on received data based on the monitored bus usage rate; and
offloading, by the first processor, the processing from the first processor to the second processor when the processing is determined to be offloaded.

* * * * *